(12) United States Patent
Fujii et al.

(10) Patent No.: US 12,454,145 B2
(45) Date of Patent: Oct. 28, 2025

(54) HEAT-SENSITIVE RECORDING BODY

(71) Applicant: OSAKA SEALING PRINTING CO., LTD., Osaka (JP)

(72) Inventors: Mai Fujii, Osaka (JP); Yusuke Egashira, Osaka (JP); Masahiko Yoshida, Osaka (JP)

(73) Assignee: OSAKA SEALING PRINTING CO., LTD., Osaka (JP)

( * ) Notice: Subject to any disclaimer, the term of this patent is extended or adjusted under 35 U.S.C. 154(b) by 134 days.

(21) Appl. No.: 17/780,007

(22) PCT Filed: Nov. 26, 2019

(86) PCT No.: PCT/JP2019/046167
§ 371 (c)(1),
(2) Date: May 25, 2022

(87) PCT Pub. No.: WO2021/106076
PCT Pub. Date: Jun. 3, 2021

(65) Prior Publication Data
US 2022/0410609 A1 Dec. 29, 2022

(51) Int. Cl.
*B41M 5/337* (2006.01)
*B41M 5/323* (2006.01)
*B41M 5/333* (2006.01)
*B41M 5/41* (2006.01)

(52) U.S. Cl.
CPC .......... *B41M 5/3372* (2013.01); *B41M 5/323* (2013.01); *B41M 5/333* (2013.01); *B41M 5/3375* (2013.01); *B41M 5/41* (2013.01); *B41M 2205/04* (2013.01); *B41M 2205/40* (2013.01)

(58) Field of Classification Search
CPC .... B41M 5/323; B41M 5/333; B41M 5/3372; B41M 5/3375; B41M 5/41; B41M 2205/04; B41M 2205/38; B41M 2205/40
See application file for complete search history.

(56) References Cited

U.S. PATENT DOCUMENTS

| 4,756,961 A | * | 7/1988 | Mouri | B41M 5/5218 |
| | | | | 428/32.25 |
| 2011/0105319 A1 | | 5/2011 | Hirai et al. | |
| 2017/0165992 A1 | * | 6/2017 | Kimura | B41M 5/3377 |

FOREIGN PATENT DOCUMENTS

| EP | 3 170 675 A1 | 5/2017 | |
| EP | 3 219 506 A1 | 9/2017 | |
| EP | 3415553 B1 * | 1/2022 | ............... C08B 5/00 |
| JP | H08-11436 A | 1/1996 | |
| JP | 2002-036725 A | 2/2002 | |
| JP | 2002-113947 A | 4/2002 | |

(Continued)

OTHER PUBLICATIONS

Machine translation of detailed description JP2018-167483. Acquired on Dec. 29, 2023.*

(Continued)

*Primary Examiner* — Gerard Higgins
(74) *Attorney, Agent, or Firm* — Maschoff Brennan

(57) ABSTRACT

A thermal recording medium includes: a transparent base material and a thermal recording layer on the base material. The thermal recording layer contains a dispersant having a carboxyl group and a crosslinking agent including an epichlorohydrin-modified polyamide polyamine resin or an organic compound containing an oxazoline group.

2 Claims, 2 Drawing Sheets

(56) References Cited

FOREIGN PATENT DOCUMENTS

| | | | |
|---|---|---|---|
| JP | 2002-316482 | A | 10/2002 |
| JP | 2004-188706 | A | 7/2004 |
| JP | 2008-194843 | A | 8/2008 |
| JP | 2009-255309 | A | 11/2009 |
| JP | 2015-030227 | A | 2/2015 |
| JP | 2016-093961 | A | 5/2016 |
| JP | 2018-167483 | A | 11/2018 |
| JP | 2019-166747 | A | 10/2019 |
| WO | 2008/139948 | A1 | 8/2010 |

OTHER PUBLICATIONS

European Office Action issued in corresponding application No. 19954347.1, dated Jul. 26, 2023.
European Search Report issued in corresponding application No. 19954347.1, dated Nov. 4, 2022.
EP Office Action dated Feb. 14, 2024 as received in Application No. 19954347.1.
JP Office Action dated Apr. 2, 2024 as received in Application No. 2021-560802.

\* cited by examiner

HEAT-SENSITIVE RECORDING BODY

TECHNICAL FIELD

The present invention relates to a thermal recording medium, and more particularly to a thermal recording medium with excellent transparency.

BACKGROUND ART

Thermal recording media are colored by a chemical reaction caused by heating by a thermal head, for example, so as to provide a recorded image. Thermal recording media are widely used not only as recording media for facsimile machines, automatic ticket vending machines, or scientific measuring machines but also as thermal recording labels for POS systems in retail stores, for example.

The thermal recording media are used outdoors in the automatic ticket vending machines or other machines. Those with excellent water resistances and storage stabilities have been proposed. More specifically, a thermal recording medium has been proposed which includes a thermal recording layer containing: a carboxyl group-containing resin such as carboxyl-modified polyvinyl alcohol; epichlorohydrin; and a polyamine/amide-based resin (see, e.g., Patent Document 1).

CITATION LIST

Patent Document

Patent Document 1: International Publication No. WO 2008/139948

SUMMARY OF THE INVENTION

Technical Problem

Assume that a thermal recording medium is used as a label on a container for various foods or as a packaging film. In this case, the label or the film hides the content of the container, which makes it difficult for consumers to check the content. A transparent label or film made of a thermal recording medium is demanded to allow consumers to check the content of a container.

However, the thermal recording medium described in Patent Document 1 still has the problem of an insufficient transparency of the thermal recording medium.

The present invention was made in view of the problem. It is an objective of the present invention to provide a thermal recording medium with excellent transparency.

Solution to the Problem

In order to achieve the objective, a first aspect of the present invention is directed to a thermal recording medium having at least a thermal recording layer on a transparent base material. The thermal recording layer contains a dispersant having a carboxyl group and a crosslinking agent containing, as a main component, an epichlorohydrin-modified polyamide polyamine resin or an organic compound containing an oxazoline group.

This configuration provides a thermal recording medium with excellent transparency.

A second aspect of the present invention is an embodiment of the first aspect. In the second aspect, the dispersant is made of a styrene acrylic copolymer ammonium salt or a styrene maleate.

A third aspect of the present invention is an embodiment of the first or second aspect. In the third aspect, the thermal recording layer contains at least one of a particulate color former or a particulate developer, and each of the color former and the developer has a particle size set to be from 0.1 μm to 1.0 μm.

Advantages of the Invention

The present invention provides a thermal recording medium with excellent transparency.

DESCRIPTION OF EMBODIMENT

Now, an embodiment of the present invention will be described in detail with reference to the drawings. The present invention is not limited to the following embodiment.

Figure 1:
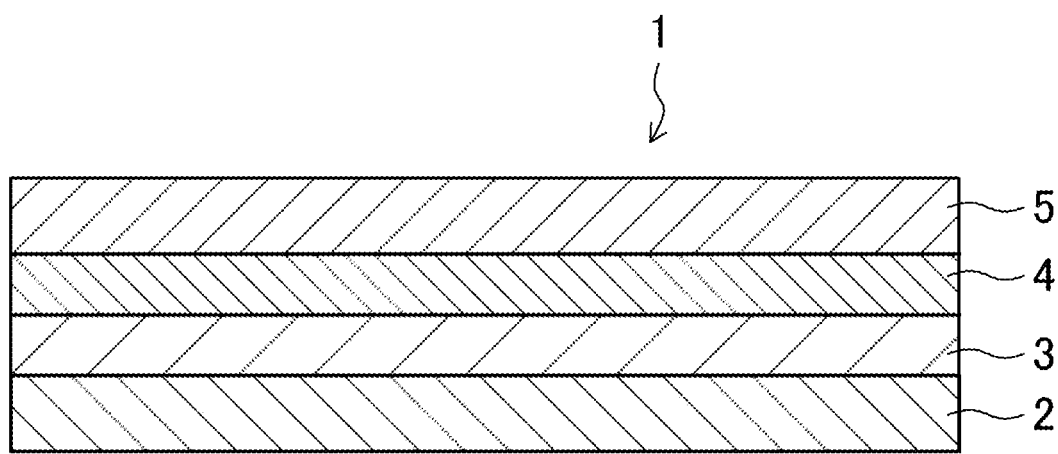
FIG. 1 is a cross-sectional view illustrating a thermal recording medium according to an embodiment.

FIG. 1 is a cross-sectional view illustrating a thermal recording medium according to this embodiment.

As shown in FIG. 1, a thermal recording medium 1 according to this embodiment has a structure in which a thermal recording layer 3 to be colored by heating, an intermediate layer 4, and a top coat 5 are stacked on a transparent sheet-like base material 2.

Examples of the base material 2 include a transparent synthetic resin film, such as a polypropylene film, a polyethylene terephthalate film, a polystyrene film, and a polycarbonate film. The thickness of the base material 2 is not particularly limited, but may be in a range of, for example, from about 10 μm to about 100 μm in one preferred embodiment to exhibit excellent coating properties and transparency.

The material of the thermal recording layer 3 includes a color former to be colored by heating, a developer, a binder, and a lubricant, for example.

In order to improve the transparency of the thermal recording layer 3, each of these materials has a small particle size in one preferred embodiment. The materials having small particle sizes can reduce diffuse reflection of the particles.

Specifically, examples of a dye serving as the color former include 3-dibutylamino-6-methyl-7-anilinofluoran, for example. The particle size may range preferably from 0.1 μm to 1.0 μm, more preferably from 0.1 μm to 0.6 μm, and particularly preferably from 0.1 μm to 0.55 μm.

Examples of the developer include 4-hydroxyphenyl(4'-n-propoxyphenyl) sulfone, for example. The particle size may range preferably from 0.1 μm to 1.0 μm, more preferably from 0.1 μm to 0.6 μm, and particularly preferably from 0.1 μm to 0.55 μm.

The particle size refers to a 50% average particle diameter measured by a Microtrac laser-scattering particle size analyzer.

Examples of the binder include a styrene-butadiene copolymer, for example.

Examples of the lubricant include polyethylene, zinc stearate, paraffin, etc. The particle size of these substances is 0.5 µm or less in one preferred embodiment.

In order to improve transparency, containing paraffin is particularly effective. This paraffin has a low melting point lower than the color developing temperature of the thermal recording layer 3, preferably less than 80° C., and more preferably less than 50° C.

The particle size of the paraffin with a low melting point is preferably 0.5 µm or less in one preferred embodiment as described above. The content of the paraffin is in a range of from 0.1 g/m$^2$ to 1.0 g/m$^2$, for example, at a dry weight in one preferred embodiment.

Since a coating liquid for forming the thermal recording layer contains paraffin with a low melting point, the paraffin melts at the application and drying of the coating liquid onto the base material 2, and enters and fills gaps in uneven surfaces of the particles forming the thermal recording layer 3. This enables a reduction in the diffuse reflection on the surfaces of the particles and an improvement in the transparency.

The intermediate layer 4 with barrier properties against water and oil is mainly made of a resin. Examples of the resin for the intermediate layer 4 include an emulsion of an acrylic resin, a water-soluble resin such as a polyvinyl alcohol (PVA) resin, an SBR resin, etc.

In order to improve the transparency, the resin is preferably a resin with a water-soluble part, for example, a polyvinyl alcohol (PVA) resin which is a resin having a hydroxy group as a hydrophilic structural unit, or a resin with a core-shell structure in which hydrophobic core particles are coated with a water-soluble shell polymer, for example, a core-shell acrylic resin.

The water-soluble polyvinyl alcohol (PVA) and the core-shell acrylic resin have excellent film-forming properties. When a coating liquid for forming the intermediate layer is applied on the thermal recording layer 3 and dried, the resin with a water-soluble part infiltrates into the thermal recording layer 3 to form a smooth intermediate layer 4. This reduces the diffuse reflection on the thermal recording layer 3 and improves the transparency.

Examples of the core-shell resin include a core-shell acrylic resin commercially available under the name of Barrier Star (manufactured by Mitsui Chemicals, Inc.).

The top coat 5 improves the matching properties of the thermal recording medium 1 with a thermal head so that the thermal recording layer 3 is colored smoothly. The top coat 5 contains a filler, a lubricant, a crosslinking agent, etc., added into a binder.

Examples of a resin serving as the binder include an acrylic resin, for example. Examples of the lubricant include polyethylene and zinc stearate, for example. Examples of the crosslinking agent include zirconium carbonate, for example.

Examples of the filler include colloidal silica, calcium carbonate, zirconium carbonate, polymethylmethacrylate (PMMA), polystyrene (PS), etc. The particle sizes of these fillers are preferably 1.0 µm or less. In order to improve the transparency, the filler may be colloidal silica with a small particle size in one preferred embodiment.

Here, the thermal recording medium 1 according to this embodiment has the following feature: the thermal recording layer 3 contains a dispersant having a carboxyl group, and a crosslinking agent containing, as a main component, an epichlorohydrin-modified polyamide polyamine resin or an organic compound containing an oxazoline group.

The dispersant containing a carboxyl group may be a styrene acrylic copolymer ammonium salt such as a styrene-acrylic polymer or a styrene maleate such as a styrene maleic acid resin.

Figure 2:
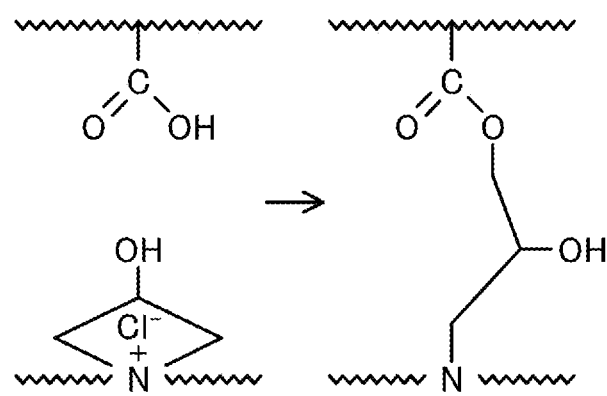
FIG. 2 illustrates a crosslinking reaction between an azetidinium ring (AZR) in an epichlorohydrin-modified polyamide polyamine resin serving as a crosslinking agent and a carboxyl group of a dispersant.

In the thermal recording layer 3, as shown in FIG. 2, the azetidinium ring (AZR) in the epichlorohydrin-modified polyamide polyamine resin serving as the crosslinking agent reacts with the carboxyl group of the dispersant to form a crosslinked structure. It is assumed that this crosslinking improves the film-forming properties of the thermal recording layer 3 and fills the voids in the thermal recording layer 3. As a result, the transparency of the thermal recording layer 3 improves, which leads to the thermal recording medium 1 with excellent transparency.

Figure 3:
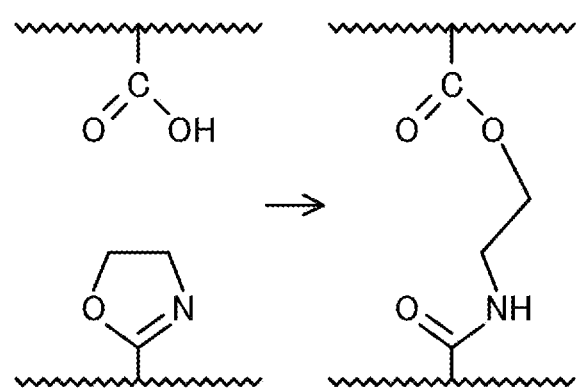
FIG. 3 illustrates a crosslinking reaction between an oxazoline group of an organic compound containing an oxazoline group serving as a crosslinking agent and a carboxyl group of a dispersant.

Similarly, in the thermal recording layer 3, as shown in FIG. 3, the oxazoline group of the oxazoline group-containing organic compound serving as the crosslinking agent reacts with the carboxyl group of the dispersant to form a crosslinked structure. It is assumed that this crosslinking improves the film-forming properties of the thermal recording layer 3 and fills the voids in the thermal recording layer 3. As a result, the transparency of the thermal recording layer 3 improves, which leads to the thermal recording medium 1 with excellent transparency.

The content of the dispersant with respect to the entire thermal recording layer 3 ranges from 5% by mass to 20% by mass in one preferred embodiment. The content of the crosslinking agent with respect to the entire thermal recording layer 3 ranges from 0.5% by mass to 10% by mass in one preferred embodiment.

EXAMPLES

Now, the present invention will be described based on examples. The present invention is not limited to these examples. Modifications and changes may be made to these examples under the spirit of the present invention and are not excluded from the scope of the present invention.

Example 1

(Preparation of Thermal Recording Medium)
<Thermal Recording Layer>

A coating liquid for forming a thermal recording layer shown in Table 1 was prepared. The prepared coating liquid for forming a thermal recording layer was applied onto an oriented polypropylene (OPP) film (i.e., a base material) having a thickness of 40 µm, in a coating amount at a dry weight of from 4.0 g/m$^2$ to 6.0 g/m$^2$. Then, the coating liquid was dried to form the thermal recording layer having a thickness of 45 µm to 50 µm on the base material. In Table 1, the respective numerical values of the compounding agents represent weight ratios in the dried state.

As compounding materials, a styrene acrylic copolymer ammonium salt was used as a dispersant, and an epichlorohydrin-modified polyamide polyamine resin was used as a crosslinking agent. In addition, 3-dibutylamino-6-methyl-7-anilinofluoran with a particle size of 0.15 µm was used as a dye; 4-hydroxyphenyl(4'-n-propoxyphenyl) sulfone with a particle size of 0.15 µm was used as a developer; and SBR with a glass transition temperature Tg of "−3° C." was used as a binder. As lubricants, polyethylene (PE) with a melting point of 100° C. and a particle size of 0.6 µm and paraffin with a melting point of 46° C. and a particle size of 0.2 μm were used. Kaolin with a particle size of 0.4 μm was used as a filler.

<Intermediate Layer>

A coating liquid made of a core-shell acrylic resin for forming an intermediate layer was prepared. The prepared coating liquid for forming an intermediate layer was applied on the thermal recording layer described above in a coating amount at a dry weight of 2.0 g/m². Then, the coating liquid was dried to form the intermediate layer having a thickness of 2.0 μm on the thermal recording layer.

<Top Coat>

A coating liquid for forming a top coat shown in Table 1 was prepared. The prepared coating liquid for forming a top coat was applied on the intermediate layer described above in a coating amount at a dry weight of 1.5 g/m². Then, the coating liquid was dried to form the top coat having a thickness of 1.5 μm on the intermediate layer.

An acrylic resin was used as a binder, and polyethylene (PE) and zinc stearate (St-Zn) were used as lubricants. Colloidal silica with a particle size of several nanometers and colloidal silica with a particle size of several tens of nanometers were used as fillers, and zirconium carbonate was used as a crosslinking agent.

A thermal recording medium according to this example was prepared in the manner described above.

<Measurement of Haze Value>

With the use of a haze meter (model number: NDH7000 manufactured by NIPPON DENSHOKU INDUSTRIES Co., Ltd.), the haze value of the obtained thermal recording medium was measured in accordance with JIS-K7136: 2000. The result is shown in Table 1.

Example 2

A thermal recording medium was prepared in the same manner as in Example 1 described above, except that the crosslinking agent in the thermal recording layer was replaced with an epichlorohydrin-modified polyamide polyamine resin with a reaction point 10% lower than that of the crosslinking agent described above, a lower degree of cationization, and a lower molecular weight.

The haze value was then measured in the same manner as in Example 1 described above. The result is shown in Table 1.

Example 3

A thermal recording medium was prepared in the same manner as in Example 1 described above, except that the crosslinking agent in the thermal recording layer was replaced with an organic compound containing an oxazoline group.

The haze value was then measured in the same manner as in Example 1 described above. The result is shown in Table 1.

Example 4

A thermal recording medium was prepared in the same manner as in Example 1 described above, except that the developer in the thermal recording layer was replaced with 4-hydroxyphenyl(4'-n-propoxyphenyl) sulfone with a particle size of 0.25 μm, and that the dye in the thermal recording layer was replaced with 3-dibutylamino-6-methyl-7-anilinofluoran with a particle size of 0.25 μm.

The haze value was then measured in the same manner as in Example 1 described above. The result is shown in Table 1.

Example 5

A thermal recording medium was prepared in the same manner as in Example 1 described above, except that the crosslinking agent in the thermal recording layer was replaced with an organic compound containing an oxazoline group, that the developer in the thermal recording layer was replaced with 4-hydroxyphenyl(4'-n-propoxyphenyl) sulfone with a particle size of 0.25 μm, and that the dye in the thermal recording layer was replaced with 3-dibutylamino-6-methyl-7-anilinofluoran with a particle size of 0.25 μm.

The haze value was then measured in the same manner as in Example 1 described above. The result is shown in Table 1.

Example 6

A thermal recording medium was prepared in the same manner as in Example 1 described above, except that the developer in the thermal recording layer was replaced with 4-hydroxyphenyl(4'-n-propoxyphenyl) sulfone with a particle size of 0.46 μm, and that the dye in the thermal recording layer was replaced with 3-dibutylamino-6-methyl-7-anilinofluoran with a particle size of 0.46 μm.

The haze value was then measured in the same manner as in Example 1 described above. The result is shown in Table 1.

Example 7

A thermal recording medium was prepared in the same manner as in Example 1 described above, except that the crosslinking agent in the thermal recording layer was replaced with an organic compound containing an oxazoline group, that the developer in the thermal recording layer was replaced with 4-hydroxyphenyl(4'-n-propoxyphenyl) sulfone with a particle size of 0.46 μm, and that the dye in the thermal recording layer was replaced with 3-dibutylamino-6-methyl-7-anilinofluoran with a particle size of 0.46 μm.

The haze value was then measured in the same manner as in Example 1 described above. The result is shown in Table 1.

Example 8

A thermal recording medium was prepared in the same manner as in Example 1 described above, except that the developer in the thermal recording layer was replaced with 4-hydroxyphenyl(4'-n-propoxyphenyl) sulfone with a particle size of 0.55 μm, and that the dye in the thermal recording layer was replaced with 3-dibutylamino-6-methyl-7-anilinofluoran with a particle size of 0.55 μm.

The haze value was then measured in the same manner as in Example 1 described above. The result is shown in Table 1.

Example 9

A thermal recording medium was prepared in the same manner as in Example 1 described above, except that the dispersant in the thermal recording layer was replaced with a styrene maleate, that the developer in the thermal recording layer was replaced with 4-hydroxyphenyl(4'-n-propoxyphenyl) sulfone with a particle size of 0.55 µm, and that the dye in the thermal recording layer was replaced with 3-dibutylamino-6-methyl-7-anilinofluoran with a particle size of 0.55 µm.

The haze value was then measured in the same manner as in Example 1 described above. The result is shown in Table 1.

Comparative Example 1

A thermal recording medium was prepared in the same manner as in Example 1 described above, except that no crosslinking agent was added.

The haze value was then measured in the same manner as in Example 1 described above. The result is shown in Table 1.

Comparative Example 2

A thermal recording medium was prepared in the same manner as in Example 1 described above, except that no crosslinking agent was added to the thermal recording layer, that the developer in the thermal recording layer was replaced with 4-hydroxyphenyl(4'-n-propoxyphenyl) sulfone with a particle size of 0.25 µm, and that the dye in the thermal recording layer was replaced with 3-dibutylamino-6-methyl-7-anilinofluoran with a particle size of 0.25 µm.

The haze value was then measured in the same manner as in Example 1 described above. The result is shown in Table 1.

Comparative Example 3

A thermal recording medium was prepared in the same manner as in Example 1 described above, except that no crosslinking agent was added to the thermal recording layer, that the developer in the thermal recording layer was replaced with 4-hydroxyphenyl(4'-n-propoxyphenyl) sulfone with a particle size of 0.46 µm, and that the dye in the thermal recording layer was replaced with 3-dibutylamino-6-methyl-7-anilinofluoran with a particle size of 0.46 µm.

The haze value was then measured in the same manner as in Example 1 described above. The result is shown in Table 1.

Comparative Example 4

A thermal recording medium was prepared in the same manner as in Example 1 described above, except that no crosslinking agent was added to the thermal recording layer, that the developer in the thermal recording layer was replaced with 4-hydroxyphenyl(4'-n-propoxyphenyl) sulfone with a particle size of 0.55 µm, and that the dye in the thermal recording layer was replaced with 3-dibutylamino-6-methyl-7-anilinofluoran with a particle size of 0.55 µm.

The haze value was then measured in the same manner as in Example 1 described above. The result is shown in Table 1.

Comparative Example 5

A thermal recording medium was prepared in the same manner as in Example 1 described above, except that no crosslinking agent was added in the thermal recording layer, that the dispersant in the thermal recording layer was replaced with a styrene maleate, that the developer in the thermal recording layer was replaced with 4-hydroxyphenyl(4'-n-propoxyphenyl) sulfone with a particle size of 0.55 µm, and that the dye in the thermal recording layer was replaced with 3-dibutylamino-6-methyl-7-anilinofluoran with a particle size of 0.55 µm.

The haze value was then measured in the same manner as in Example 1 described above. The result is shown in Table 1.

Comparative Example 6

A thermal recording medium was prepared in the same manner as in Example 1 described above, except that the dispersant in the thermal recording layer was replaced with polyvinyl alcohol with a degree of polymerization of 500 and a degree of saponification of from 86.5 to 89.0, that the developer in the thermal recording layer was replaced with 4-hydroxyphenyl(4'-n-propoxyphenyl) sulfone with a particle size of 0.55 µm, and that the dye in the thermal recording layer was replaced with 3-dibutylamino-6-methyl-7-anilinofluoran with a particle size of 0.55 µm.

The haze value was then measured in the same manner as in Example 1 described above. The result is shown in Table 1.

Comparative Example 7

A thermal recording medium was prepared in the same manner as in Example 1 described above, except that no crosslinking agent was added to the thermal recording layer, that the dispersant in the thermal recording layer was replaced with polyvinyl alcohol with a degree of polymerization of 500 and a degree of saponification of from 86.5 to 89.0, that the developer in the thermal recording layer was replaced with 4-hydroxyphenyl(4'-n-propoxyphenyl) sulfone with a particle size of 0.55 µm, and that the dye in the thermal recording layer was replaced with 3-dibutylamino-6-methyl-7-anilinofluoran with a particle size of 0.55 µm.

The haze value was then measured in the same manner as in Example 1 described above. The result is shown in Table 1.

TABLE 1

| | | | Example | | | | | | | | |
| --- | --- | --- | --- | --- | --- | --- | --- | --- | --- | --- | --- |
| | | | 1 | 2 | 3 | 4 | 5 | 6 | 7 | 8 | 9 |
| Thermal Recording Layer | Dispersant | Styrene Acrylic Copolymer Ammonium Salt | 13 | 13 | 13 | 11 | 11 | 6 | 6 | 7 | |
| | | Styrene Maleate | | | | | | | | | 10 |
| | | Polyvinyl Alcohol | | | | | | | | | |

TABLE 1-continued

|  |  |  | Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
|  | Crosslinking Agent | Epichlorohydrin-Modified Polyamide Polyamine Resin | 1 | 1 |  | 0.9 |  | 0.5 | 0.5 |  | 0.9 |
|  |  | Oxazoline |  |  | 1 |  | 0.9 |  |  | 0.5 |  |
|  | Dye |  | 12 | 12 | 12 | 12 | 12 | 14 | 14 | 13 | 12 |
|  | Developer |  | 37 | 37 | 37 | 37 | 37 | 40 | 40 | 40 | 34 |
|  | Binder |  | 26 | 26 | 26 | 28 | 28 | 23.5 | 23.5 | 23.5 | 28.5 |
|  | Lubricant (Polyethylene) |  | 1.5 | 1.5 | 1.5 | 1.5 | 1.5 | 1.6 | 1.6 | 1.6 | 1.5 |
|  | Lubricant (Paraffin) |  | 1.5 | 1.5 | 1.5 | 1.6 | 1.6 | 3.4 | 3.4 | 3.4 | 3.1 |
|  | Filler (Kaolin) |  | 8 | 8 | 8 | 8 | 8 | 11 | 11 | 11 | 10 |
|  | Particle Size [μm] of Dye |  | 0.15 | 0.15 | 0.15 | 0.25 | 0.25 | 0.46 | 0.46 | 0.55 | 0.55 |
|  | Particle Size [μm] of Developer |  | 0.15 | 0.15 | 0.15 | 0.25 | 0.25 | 0.46 | 0.46 | 0.55 | 0.55 |
| Intermediate Layer | Core-Shell Acrylic Resin |  | 100 | 100 | 100 | 100 | 100 | 100 | 100 | 100 | 100 |
| Top Coat | Binder |  | 41 | 41 | 41 | 41 | 41 | 41 | 41 | 41 | 41 |
|  | Lubricant (Polyethylene) |  | 11 | 11 | 11 | 11 | 11 | 11 | 11 | 11 | 11 |
|  | Lubricant (Zinc Stearate) |  | 6 | 6 | 6 | 6 | 6 | 6 | 6 | 6 | 6 |
|  | Filler |  | 36 | 36 | 36 | 36 | 36 | 36 | 36 | 36 | 36 |
|  | Crosslinking Agent |  | 6 | 6 | 6 | 6 | 6 | 6 | 6 | 6 | 6 |
| Transparency Evaluation | Haze Value [%] |  | 13.32 | 14.77 | 24.57 | 40.43 | 48.60 | 73.96 | 76.40 | 75.18 | 59.28 |

|  |  |  | Comparative Example |  |  |  |  |  |  |
|---|---|---|---|---|---|---|---|---|---|
|  |  |  | 1 | 2 | 3 | 4 | 5 | 6 | 7 |
| Thermal Recording Layer | Dispersant | Styrene Acrylic Copolymer Ammonium Salt | 13 | 11 | 6 | 7 |  |  |  |
|  |  | Styrene Maleate |  |  |  |  | 10 |  |  |
|  |  | Polyvinyl Alcohol |  |  |  |  |  | 6 | 6 |
|  | Crosslinking Agent | Epichlorohydrin-Modified Polyamide Polyamine Resin |  |  |  |  |  | 0.6 |  |
|  |  | Oxazoline |  |  |  |  |  |  |  |
|  | Dye |  | 12 | 12 | 14 | 13 | 12 | 13 | 13 |
|  | Developer |  | 37 | 37 | 40 | 40 | 34 | 38 | 38 |
|  | Binder |  | 27 | 29 | 24 | 24 | 29 | 29 | 29 |
|  | Lubricant (Polyethylene) |  | 1.5 | 1.5 | 1.6 | 1.6 | 1.5 | 1.5 | 1.5 |
|  | Lubricant (Paraffin) |  | 1.5 | 1.5 | 3.4 | 3.4 | 3.5 | 1.5 | 1.5 |
|  | Filler (Kaolin) |  | 8 | 8 | 11 | 11 | 10 | 10 | 11 |
|  | Particle Size [μm] of Dye |  | 0.15 | 0.25 | 0.46 | 0.55 | 0.55 | 0.55 | 0.55 |
|  | Particle Size [μm] of Developer |  | 0.15 | 0.25 | 0.46 | 0.55 | 0.55 | 0.55 | 0.55 |
| Intermediate Layer | Core-Shell Acrylic Resin |  | 100 | 100 | 100 | 100 | 100 | 100 | 100 |
| Top Coat | Binder |  | 41 | 41 | 41 | 41 | 41 | 41 | 41 |
|  | Lubricant (Polyethylene) |  | 11 | 11 | 11 | 11 | 11 | 11 | 11 |
|  | Lubricant (Zinc Stearate) |  | 6 | 6 | 6 | 6 | 6 | 6 | 6 |
|  | Filler |  | 36 | 36 | 36 | 36 | 36 | 36 | 36 |
|  | Crosslinking Agent |  | 6 | 6 | 6 | 6 | 6 | 6 | 6 |
| Transparency Evaluation | Haze Value [%] |  | 28.90 | 51.88 | 76.42 | 81.58 | 61.62 | 90.27 | 83.15 |

Table 1 shows that the thermal recording paper according to each of Examples 1 to 3, in which the thermal recording layer contains the dispersant having the carboxyl group and the crosslinking agent (and the particle size of the dye and the developer is 0.15 μm), has a smaller haze value than that of Comparative Example 1 in which the thermal recording layer contains no crosslinking agent (and the particle size of the dye and the developer is 0.15 μm). That is, the thermal recording media of Examples 1 to 3 have an improved transparency.

Table 1 also shows that the thermal recording paper according to each of Examples 4 and 5, in which the thermal recording layer contains the dispersant having the carboxyl group and the crosslinking agent (and the particle size of the dye and the developer is 0.25 μm), has a smaller haze value than that of Comparative Example 2 in which the thermal recording layer contains no crosslinking agent (and the particle size of the dye and the developer is 0.25 μm). That is, the thermal recording media of Examples 4 and 5 have an improved transparency.

Table 1 also shows that the thermal recording paper according to each of Examples 6 and 7, in which the thermal recording layer contains the dispersant having the carboxyl group and the crosslinking agent (and the particle size of the dye and the developer is 0.46 μm), has a smaller haze value than that of Comparative Example 3 in which the thermal recording layer contains no crosslinking agent (and the particle size of the dye and the developer is 0.46 μm). That is, the thermal recording media of Examples 6 and 7 have an improved transparency.

Table 1 also shows that the thermal recording paper according to Example 8, in which the thermal recording layer contains the dispersant having the carboxyl group and the crosslinking agent (and the particle size of the dye and the developer is 0.55 μm), has a smaller haze value than that of Comparative Example 4 in which the thermal recording layer contains no crosslinking agent (and the particle size of the dye and the developer is 0.55 μm). That is, the thermal recording medium of Example 8 has an improved transparency.

Table 1 also shows that the thermal recording paper according to Example 9, in which the thermal recording layer contains the dispersant having the carboxyl group and the crosslinking agent (the dispersant is the styrene maleate, and the particle size of the dye and the developer is 0.55 µm), has a smaller haze value than that of Comparative Example 5 in which the thermal recording layer contains no crosslinking agent (the dispersant is the styrene maleate, and the particle size of the dye and the developer is 0.55 µm). That is, the thermal recording medium of Example 9 has an improved transparency.

It is also shown that the thermal recording media of Comparative Examples 6 and 7 using the dispersant (polyvinyl alcohol) having no carboxyl group (the particle size of the dye and the developer is 0.55 µm) have lower transparency than the thermal recording media of Examples 8 and 9 using the dispersant having the carboxyl group (i.e., the styrene acrylic copolymer ammonium salt or the styrene maleate) (the particle size of the dye and the developer is 0.55 µm), regardless of the presence or absence of the crosslinking agent.

INDUSTRIAL APPLICABILITY

As described above, the present invention is particularly useful for a thermal recording medium used as a label on a container for various foods or a packaging film.

DESCRIPTION OF REFERENCE CHARACTERS

1 Thermal Recording Medium
2 Base Material
3 Thermal Recording Layer
4 Intermediate Layer
5 Top Coat

The invention claimed is:

1. A thermal recording medium having at least a thermal recording layer, an intermediate layer, and a top coat on a transparent base material in this order, wherein
the thermal recording layer contains:
a reaction product of a dispersant having a carboxyl group and a crosslinking agent containing, as a main component, an epichlorohydrin-modified polyamide polyamine resin or an organic compound containing an oxazoline group; and
at least one of a particulate color former or a particulate developer,
the intermediate layer includes a resin having a core-shell structure, and
the dispersant is a styrene acrylic copolymer ammonium salt.

2. The thermal recording medium of claim 1, wherein each of the color former and the developer has a particle size of from 0.1 µm to 1.0 µm.

* * * * *